(12) United States Patent
Smith

(10) Patent No.: US 7,112,308 B2
(45) Date of Patent: Sep. 26, 2006

(54) SULFUR TRAP SEALING DEVICE

(76) Inventor: Strom W. Smith, P.O. Box 218358, Houston, TX (US) 77218

(*) Notice: Subject to any disclaimer, the term of this patent is extended or adjusted under 35 U.S.C. 154(b) by 356 days.

(21) Appl. No.: 10/619,842

(22) Filed: Jul. 15, 2003

(65) Prior Publication Data

US 2005/0011362 A1   Jan. 20, 2005

(51) Int. Cl.
B01D 50/00 (2006.01)
B01D 41/00 (2006.01)

(52) U.S. Cl. .................. 422/168; 96/155; 96/409
(58) Field of Classification Search ................ 422/177; 55/216, 421, 425, 432; 96/409
See application file for complete search history.

(56) References Cited

U.S. PATENT DOCUMENTS

| 1,448,972 A * | 3/1923 | Long .................. 137/192 |
| 4,035,158 A | 7/1977 | Scott et al. |
| 4,085,199 A | 4/1978 | Singleton et al. |
| 4,117,100 A | 9/1978 | Hellmer et al. |
| 4,185,140 A | 1/1980 | Strella et al. |
| 4,255,408 A | 3/1981 | Sims |
| 4,341,753 A | 7/1982 | Mori et al. |
| 4,504,459 A | 3/1985 | Stothers |
| 5,498,270 A | 3/1996 | Smith |

* cited by examiner

*Primary Examiner*—Glenn Caldarola
*Assistant Examiner*—Tom P. Duong
(74) *Attorney, Agent, or Firm*—Kenneth A. Keeling; Keeling Patents & Trademarks

(57) ABSTRACT

A sealing device for a sulfur trap includes a float, a counterweight, and a cleaning rod. The density of the sealing device allows flotation of the device in molten sulfur. The counterweight includes a surface to mate with an upwardly extending hollow cylinder in the sulfur trap through which molten sulfur may flow. The sealing device engages the upwardly extending cylinder in a first position and floats in the molten sulfur contained in an upper chamber of the sulfur trap in a second position. The cleaning rod and counterweight contact the sides of the upwardly extending cylinder to prevent buildup of solid sulfur.

5 Claims, 3 Drawing Sheets

SULFUR TRAP SEALING DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to equipment for separating molten sulfur from associated gases in industrial operations producing molten sulfur, such as oil refineries. More specifically, this invention relates to a seal for a sulfur trap.

2. Description of the Related Art

Gaseous compounds containing sulfur, such as hydrogen sulfide, mercaptans, carbonyl sulfide, carbon disulfide, exist in natural gas. Such gaseous compounds are produced as by-products in petroleum refining operations.

In industrial applications, gas streams containing sulfur compounds are processed to remove sulfur (primarily in the form of hydrogen sulfide). The gas streams are then further processed to form liquid sulfur in sulfur recovery units.

Conventional sulfur recovery units include a seal leg or trapping device to separate molten sulfur from the gas stream. The molten sulfur is condensed from the remaining gas stream.

The discharge into the atmosphere of residual tail gases associated with such molten sulfur, such as sulfur dioxide and hydrogen sulfide, is environmentally unacceptable. It is therefore necessary to separate the elemental sulfur from the tail gases associated therewith.

Sulfur traps associated with sulfur recovery units, as historically designed, include two concentrically arranged vertical pipes. The vertical pipes may extend approximately twenty feet to twenty-five feet into the ground. The outer pipe is capped at its lower end. The inner pipe lower end is displaced above the capped lower end of the outer pipe allowing molten sulfur to flow from the inner pipe to the annular space between the pipes. Molten sulfur is received into the inner pipe, flows downwardly from the inner pipe and upwardly in the annular space between the inner pipe and the outer pipe to a discharge pipe connected to the outer pipe. The discharge pipe transmits the sulfur into a sulfur storage tank where the sulfur may be maintained until pumped out for shipping or other disposition. A jacket is provided outside the outer pipe, with steam circulated between the jacket and the outer pipe to maintain the temperature of the sulfur trap above 250 degrees Fahrenheit and accordingly to maintain the sulfur in a liquid phase. The annular arrangement of the inner pipe and outer pipe provides a liquid trap preventing tail gases from being transferred in the storage tank.

Kuvasnikoff et al U.S. Pat. No. 4,185,140, Sims U.S. Pat. No. 4,255,408 and Singleton et al. U.S. Pat. No. 4,085,199 disclose processes for removing sulfur and sulfur compounds from sulfur bearing gases.

Stothers U.S. Pat. No. 4,504,459 discloses process and apparatus for extraction of elemental sulfur from sulfur compound gases.

Mori et al. U.S. Pat. No. 4,341,753 and Hellmer et al. U.S. Pat. No. 4,117,100 disclose processes and apparatus for converting sulfur dioxide and gas to sulfur.

Scott et al. U.S. Pat. No. 4,035,158 discloses a process and apparatus for burning hydrogen sulfide and other combustible fluids to recover sulfur.

Conventional in-ground sulfur traps require ground excavation and buried lines to install the concentric piping, the steam jacket and steam lines. In operation, the inner pipe or the annulus may become blocked or partially blocked from time to time by materials such as contaminated sulfur, carbon, catalyst dust, etc. To remove the blockage it is often necessary that the trap be partially disassembled and the inner pipe or annulus rodded out to restore circulation.

Operating pressures upstream of the conventional in-ground sulfur traps must be limited due to the nature of the liquid trap. Other disadvantages of conventional sulfur seal systems are that they extend 20' or more into the earth, and that they are not easily cleaned.

U.S. Pat. No. 5,498,270 by this inventor discloses a sulfur trap that includes a sphere that engages an upwardly extending cylinder in a first position and that floats in the molten sulfur contained in the upper chamber in a second position.

The sulfur trap disclosed in U.S. Pat. 5,498,270 provided improved sealing over the prior art sulfur separation systems while allowing the process to operate at relatively high pressures upstream of the seal. Additionally, it did not require deep excavation and was relatively easy to clean.

The present invention comprises an improvement to the art by providing a self-cleaning mechanism on the trap enhancing the sealing interface.

BRIEF SUMMARY OF THE INVENTION

It is an object of the present invention to provide a system that effectively separates elemental molten sulfur from associated tail gases and that has an improved sulfur sealing system.

It is also an object of the present invention to provide a self-cleaning mechanism to reduce solid sulfur build-up in the sulfur trap.

The sulfur trap of the present invention comprises generally a vertically-elongated upper chamber for receiving molten sulfur together with sulfur containing gases, a lower chamber disposed below the upper chamber, a wall segregating the lower chamber and the upper chamber, an orifice provided in the wall for fluid transfer from the upper to the lower chamber, an upwardly extending hollow cylinder adjacent the orifice wall, a spherical device in said upper chamber, a sealing device attached to said spherical device, said device engaging the upwardly extending cylinder in a first sealing position and said device floating in the molten sulfur contained in the upper chamber in a second sulfur-flowing position. The sealing device includes a counterweight extending from the lower outer surface. A beveled surface on the counterweight engages a beveled surface around the top of the upwardly extending cylinder. When the sealing device is in a first position, the beveled surface of the counterweight nests with the beveled surface of the upwardly extending cylinder and a portion of the counterweight is contained within the upwardly extending cylinder. A cleaning rod extends below the counterweight, further into the upwardly extending cylinder. Upon introduction of the molten sulfur into the upper chamber in sufficient quantities, the hydrostatic pressure of the molten sulfur displaces the spherical device upwardly to allow molten sulfur to flow through the orifice into the lower chamber. When the molten sulfur displaces the sealing device into the second position, the counterweight maintains the device orientation and the cleaning rod keeps the device aligned with the upwardly extending cylinder. The cleaning rod and counterweight reduce solid sulfur accumulations from the side of the cylinder and interface surface.

A discharge is fluidly connected to the lower chamber. An external shell is provided around the upper and lower chambers for circulating steam in the annular space between the shell and the upper and lower chambers to maintain the sulfur in a liquid phase.

DESCRIPTION OF THE INVENTION

Figure 1:
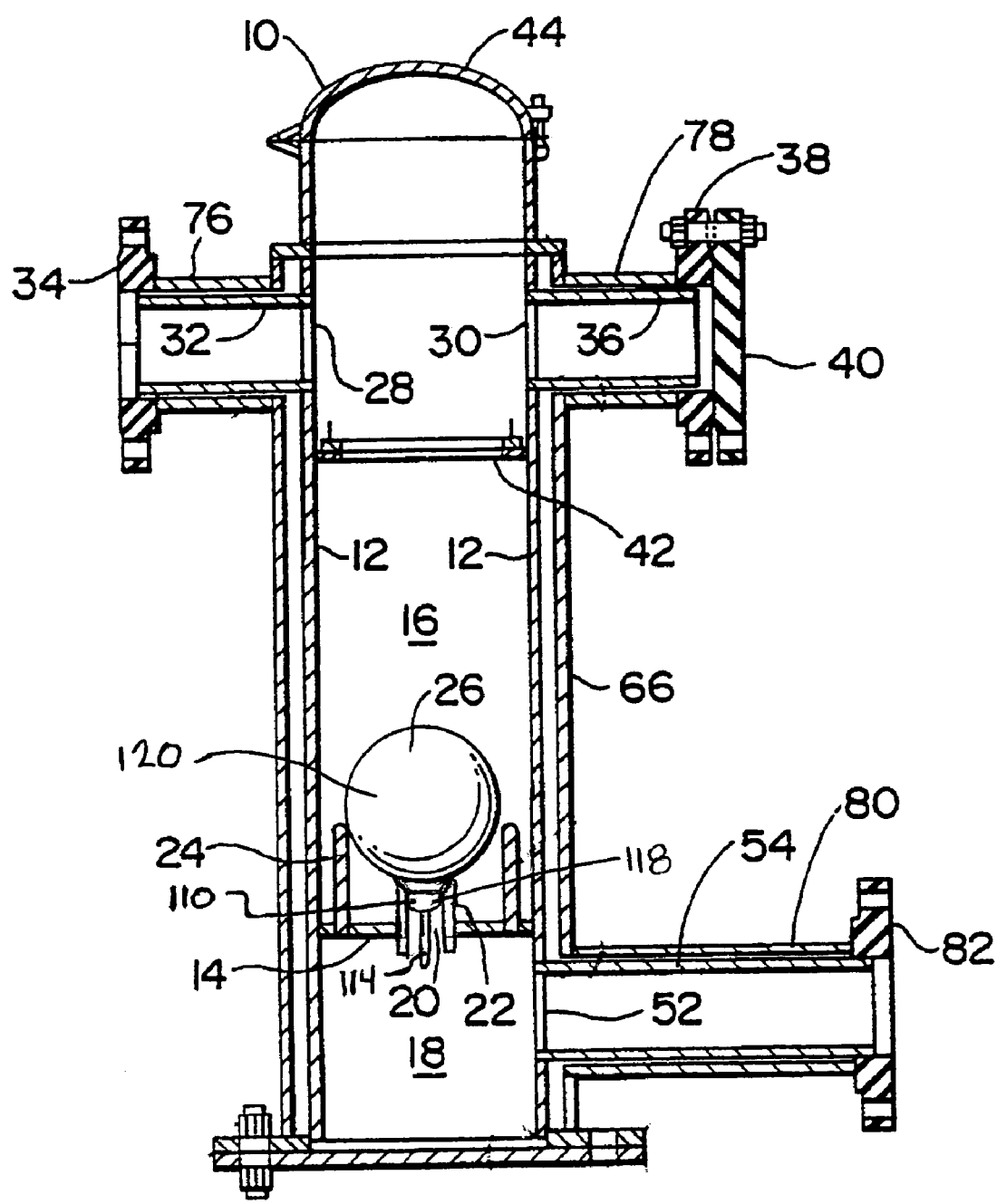
FIG. 1 FIG. 1 depicts a cross-sectional view of the sulfur trap of the present invention.

Referring first to FIG. 1, the sulfur trap 10 of the present invention is depicted in a cross-sectional drawing. The sulfur trap 10 includes an elongated, vertically oriented, cylindrical wall 12 having a segregating plate 14 horizontally disposed therein, segregating plate 14 defining an upper chamber 16 and a lower chamber 18 within cylindrical wall 12. An orifice 20 is provided centrally of plate 14. An upwardly extending, cylindrical member 22 is attached to the plate 14 with the hollow center of cylindrical member 22 aligned with the orifice 20 provided in segregating plate 14. Cylindrical member 22 is provided with edges beveled outwardly along an upper edge 23, shown in FIG. 3. Upwardly extending rods 24 are fixedly attached to plate 14 between the cylindrical member 22 and cylindrical wall 12.

Figure 2:
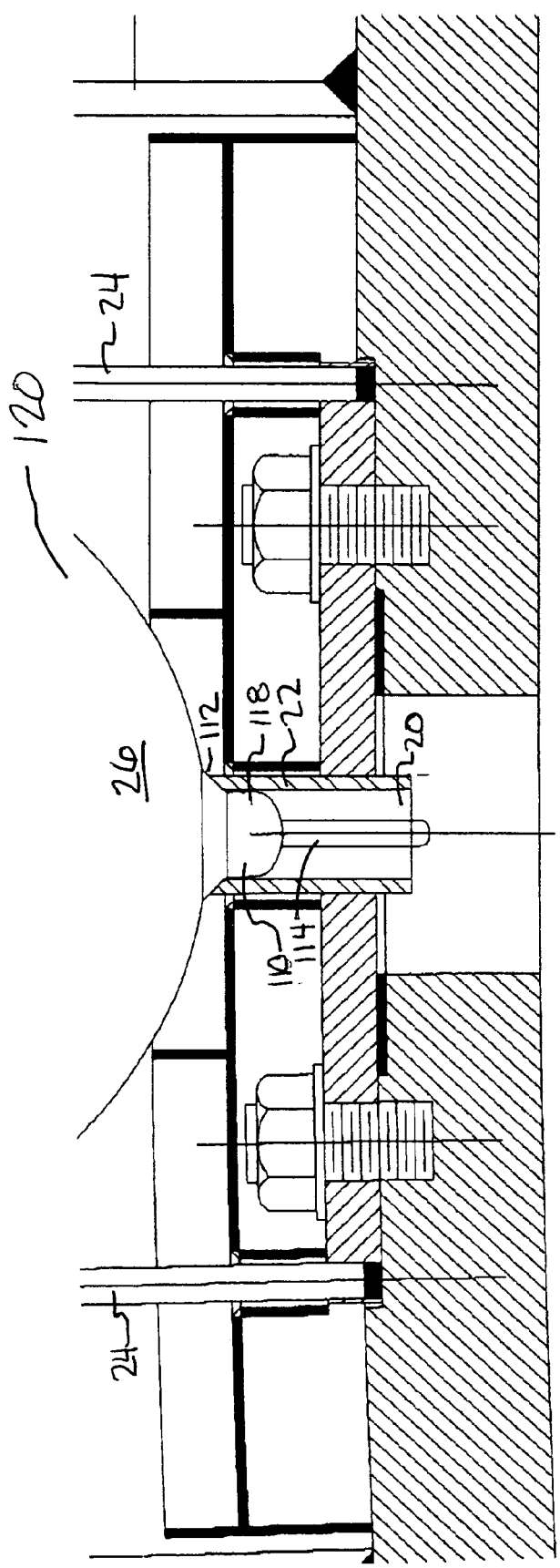
FIG. 2 depicts a partial cross-sectional view of the sealing device engaging the cylindrical member in a first closed position.

A sealing device 120 is disposed on the upper end of cylindrical member 22. In the preferred embodiment, sealing device 120 includes a sphere 26, a counterweight 110 and a cleaning rod 114. Counterweight 110 is affixed to the underside of sphere 26. Counterweight 110 has a beveled surface 112, depicted in FIG. 2. Cleaning rod 114 extends downwardly from counterweight 110 through orifice 20. As depicted in FIG. 2, beveled surface 112 engages upper edge 23 of cylindrical member 22 when sealing device 120 is not floating in the molten sulfur.

Counterweight 110 is provided with an arcuate lower surface 118. The arcuate lower surface 118 facilitates centering of counterweight 110 in cylindrical member 22.

When sealing device 120 is pushed upwards from cylindrical member 22, counterweight 110 serves to maintain sphere 26 in an orientation such that counterweight 110 is always below sphere 26. The flow of molten sulfur can cause sphere 26 to float slightly from side to side. As sphere 26 shifts, cleaning rod 114 scrapes the inside of cylindrical member 22, thereby removing sulfur solids (not shown) that may have accumulated. Cleaning rod 114 also keeps sphere 26 aligned with cylindrical member 22 so that when the flow of molten sulfur stops, sphere 26 will come to rest with beveled surface 112 interfacing with beveled edge 23 on cylindrical member 22.

In the preferred embodiment, counterweight 110 extends into cylindrical member 22 when sealing device 120 is seated against cylindrical member 22. As the flow of molten sulfur pushes sealing device 120 upwards, the portion of counterweight 110 within cylindrical member 22 disengages sulfur solids that may have accumulated. Beveled surface 112 also scrapes upper surface 23, removing sulfur solids (not shown) that interfere with the seal between sealing device 120 and cylindrical member 22.

Referring to FIG. 1, an inlet orifice 28 is provided near the upper end of chamber 16 in cylindrical wall 12. Inlet orifice 28 is connected to inlet pipe 32. Inlet pipe 32 is connected to an inlet pipe flange 34. Inlet pipe flange 34 is connected to a condenser (not shown) or other source of molten elemental sulfur and associated sulfur-containing gases. Inlet pipe 32 provides fluid communication between upper chamber 16 and the condenser.

Still referring to FIG. 1, a second upper chamber orifice 30 is provided near the upper end of upper chamber 16 in cylindrical wall 12. Said second orifice 30 is connected to connecting pipe 36. Connecting pipe 36 is connected to connecting flange 38. As depicted in FIG. 1, connecting flange 38 is connected to a blind flange 40.

As depicted in the preferred embodiment, molten sulfur inlet to the sulfur trap 10 may be introduced into the sulfur trap 10 through inlet orifice 28 and inlet pipe 32. However, orifice 30 and connecting pipe 36 are provided for alternate inlet means of molten sulfur or for cleaning the sulfur inlet line connected to inlet pipe 32 of any solids deposited therein by using a straight rod.

A screen assembly 42 is disposed horizontally in upper chamber 16 below orifices 28 and 30. The screen is above and remote from segregating plate 14.

Still referring to FIG. 1, a rounded cap 44 is provided at the upper end of cylindrical wall 12. Cap 44 is hingedly attached to cylindrical wall 12.

A discharge orifice 52 is provided in cylindrical wall 12 near its lower end at lower chamber 18. A discharge pipe 54 is connected to discharge orifice 52. Discharge pipe flange 82 is connected to discharge pipe 54 at its end distal from discharge orifice 52.

Shell members 66, 76, 78 and 80 are provided around the cylindrical wall 12, inlet pipe 32, connecting pipe 36 and connecting pipe 54.

Figure 3:
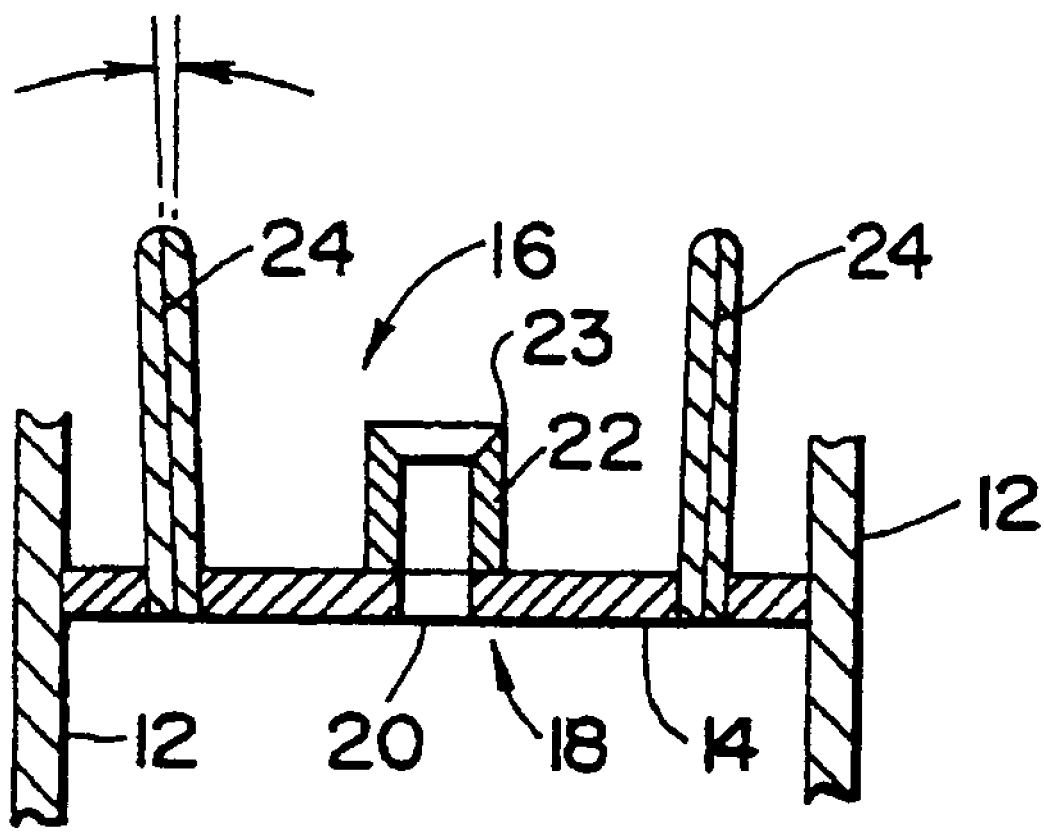
FIG. 3 depicts a cross-sectional view of the dividing wall segregating the upper and lower chambers.

Referring now to FIG. 3, details of construction of the segregating plate 14 are depicted. Segregating plate 14 comprises a generally circular plate connected to the interior surface of cylindrical wall 12 throughout the exterior circumference of the plate 14. Orifice 20 is centrally located in connecting plate 14. Cylindrical member 22 extends upwardly from plate 14 into upper chamber 16.

Cylindrical member 22 is provided with upper edges beveled outwardly. The beveled edges create an upper edge 23 of outer wall 22. Absent an obstruction such as sealing device 120, the orifice 20 and the interior of hollow cylindrical member 22 provide fluid communication between upper chamber 16 and lower chamber 18.

Still referring to FIG. 3, a plurality of rods 24, are connected to plate 14, said rods extending upwardly into upper chamber 16. Four rods 24 are provided in the preferred embodiment shown. Rods 24 are provided with rounded upper ends. Rods 24 are inclined outwardly at the upper ends. Rods 24 serve to center the sphere 26 over cylindrical member 22 and are sized and spaced accordingly.

OPERATION

Referring to FIG. 1, the operation of the present invention is depicted. Molten sulfur is received into upper chamber 16 through inlet pipe 32, the molten sulfur containing tail gases including gaseous compounds containing sulfur, such as hydrogen sulfide, mercaptans, carbonyl sulfide, and carbon disulfide. Such molten sulfur is induced by gravity to flow through the screen assembly 42, where large particles, including coagulated clumps of sulfur and sulfur compounds, are segregated from the molten sulfur. As a volume of sulfur accumulates in the upper chamber 16, the sealing device 120 is displaced upwardly from its resting place at the upper edge 23 of cylindrical member 22. The sealing device 120 is constructed with such an average density to float in molten sulfur. Such displacement of sealing device 120 allows molten sulfur to flow through the orifice 20 into lower chamber 18 and thence through discharge pipe 54 to a storage tank or other receptacle.

The flow of molten sulfur into the lower chamber 18 continues during the period that sphere 26 is displaced from upper edge 23. A liquid seal is maintained during such flow by the liquid sulfur, preventing process gas from escaping with liquid sulfur to the lower chamber. As sealing device 120 is displaced from cylindrical member 22, counterweight 110 maintains sphere 26 in an orientation relative to cylindrical member 22 with counterweight 110 below sphere 26. Variations in the flow of molten sulfur cause sphere 26 to rotate and move slightly from side to side. As sphere 26 rotates and moves, cleaning rod 114 scrapes solid sulfur build up from the inside surface of cylindrical member 22, thereby keeping it free of solid sulfur accumulation that can inhibit the flow of molten sulfur to lower chamber 18. Counterweight 110 also scrapes the top inner portion of cylindrical member 22 and upper edge 23, reducing solid sulfur build up that compromises the integrity of the seal between counterweight 110 and cylindrical member 22 when the flow of molten sulfur decreases.

Upon reduction of volume of molten sulfur in upper chamber 16, sphere 26 with counterweight 110 drops to its original position at upper edge 23 of cylindrical member 22. Arcuate lower surface 118 facilitates centering of counterweight 110 in cylindrical member 22. Further flow of molten sulfur through orifice 20 is thereby terminated. The centering of sphere 26 on upper edge 23 is facilitated by rods 24, said rods 24 being so located and sized as to direct sphere 26 to the center of chamber 16. Further, cleaning rod 114 facilitates the centering of counterweight 110 over cylindrical member 22. Beveled surface 112 interfaces with upper edge 23 to provide an effective seal against such flow of molten sulfur.

Steam is continually circulated through the annular spaces between shell members 66, 76, 78, and 80 and cylindrical wall 12, inlet pipe 32, connecting pipe 36 and discharge pipe 54 to maintain the temperature within sulfur trap 10 above 250 degrees Fahrenheit. The sulfur contained within sulfur trap 10 is thereby maintained in a liquid phase.

As required for cleaning and to remove coagulated sulfur material, cap 44 may be rotated to an open position. The screen assembly 42 may then be removed from the upper chamber 16.

The foregoing description of the invention illustrates a preferred embodiment thereof. Various changes may be made in the details of the illustrated construction within the scope of the appended claims without departing from the true spirit of the invention. The present invention should only be limited by the claims and their equivalents.

What is claimed is:

1. A sealing device for a sulfur trap of the type comprising an upper chamber for receiving liquid sulfur and process gas and a lower chamber for receiving liquid sulfur said device comprising:

an opening between said upper chamber and said lower chamber;
a hollow cylinder extending upwardly from said opening into said upper chamber;
said cylinder having an upper edge;
a float;
said float consisting of a generally spherical structure with a counterweight attached;
said float and said counterweight having a combined average density less than the density of molten sulfur;
said counterweight having a beveled peripheral surface and an acute lower extension below said beveled peripheral surface;
said cylinder upper edge having a beveled upper edge surface;
said counterweight beveled peripheral surface and said beveled upper edge surface sealingly engaged in a float first position; and
a cleaning rod attached to said counterweight; and
said cleaning rod extending downwardly into said cylinder.

2. The sealing device of claim 1, further comprising:
said float moveable between said float first position and a float floating position;
said counterweight supported on said cylinder upper edge in said float first position; and
said counterweight removed from said cylinder upper edge in said float floating position.

3. The sealing device of claim 1, further comprising:
said counterweight lower surface extending inside said cylinder in said float first position.

4. The sealing device of claim 1, further comprising:
said hollow cylinder having an interior surface;
said cleaning rod so sized and constructed to engage said interior surface upon relative movement of said float in relation to said cylinder.

5. A sealing device for a sulfur trap of the type comprising an upper chamber receiving liquid sulfur and process gas and a lower chamber for receiving liquid sulfur, said device comprising:

an opening between said upper chamber and said lower chamber;
a hollow cylinder extending upwardly from said opening into said upper chamber;
said cylinder having an upper edge having a beveled upper edge surface;
a float;
a counterweight attached to said float, said counterweight having a beveled peripheral surface and an arcuate lower extension below said beveled peripheral surface;
said counterweight constructed to sealingly engage said upper edge in a float first position, said arcuate lower extension extending inside said hollow cylinder in said float first position;
said float and said counterweight having a combined average density less than the density of molten sulfur:
said float moveable between said float first position and a float floating position;
said float laterally moveable between said float floating position;
a cleaning rod attached to said counterweight; and
said cleaning rod extending downwardly into said cylinder.

* * * * *

UNITED STATES PATENT AND TRADEMARK OFFICE
CERTIFICATE OF CORRECTION

| | | |
|---|---|---|
| PATENT NO. | : 7,112,308 B2 | Page 1 of 1 |
| APPLICATION NO. | : 10/619842 | |
| DATED | : September 26, 2006 | |
| INVENTOR(S) | : Strom W. Smith | |

It is certified that error appears in the above-identified patent and that said Letters Patent is hereby corrected as shown below:

In the claims

Column 6, line 12, that portion of claim 1 reading "acute" should read --arcuate--.

Column 6, line 60, that portion of claim 5 reading "between" should read --in--.

Signed and Sealed this
Twenty-ninth Day of December, 2015

Michelle K. Lee
*Director of the United States Patent and Trademark Office*